United States Patent
Heinrich et al.

(10) Patent No.: US 8,079,568 B2
(45) Date of Patent: Dec. 20, 2011

(54) VALVE WITH MAGNETIC SEALING ELEMENT MADE OF FOAM

(75) Inventors: Ralf Heinrich, Schwegenheim (DE); Torsten Gerlich, Bensheim (DE); Christoph Gund, Dossenheim (DE); Klaus Bickel, Rimbach (DE)

(73) Assignee: Carl Freudenberg KG, Weinheim (DE)

( * ) Notice: Subject to any disclaimer, the term of this patent is extended or adjusted under 35 U.S.C. 154(b) by 671 days.

(21) Appl. No.: 12/218,284

(22) Filed: Jul. 14, 2008

(65) Prior Publication Data

US 2009/0057587 A1   Mar. 5, 2009

(30) Foreign Application Priority Data

Aug. 29, 2007   (DE) .......................... 10 2007 041 050

(51) Int. Cl.
*F16K 31/02* (2006.01)
*H01F 7/08* (2006.01)

(52) U.S. Cl. ......... 251/129.06; 251/129.01; 251/129.15; 335/279; 335/215

(58) Field of Classification Search ............. 251/129.01, 251/129.06, 129.15, 65; 137/909; 123/90.11; 335/215, 279–280, 296–298, 303
See application file for complete search history.

(56) References Cited

U.S. PATENT DOCUMENTS

| | | | | |
|---|---|---|---|---|
| 3,409,038 A | * | 11/1968 | Blackford | 137/516.15 |
| 3,891,000 A | * | 6/1975 | Melnick | 137/855 |
| 5,711,342 A | * | 1/1998 | Kazama et al. | 137/486 |
| 2004/0094737 A1* | | 5/2004 | Yeh | 251/129.06 |
| 2004/0255915 A1* | | 12/2004 | Veinotte | 123/520 |
| 2005/0253103 A1* | | 11/2005 | Bente et al. | 251/129.15 |
| 2007/0241849 A1* | | 10/2007 | Heinrich et al. | 335/215 |

FOREIGN PATENT DOCUMENTS

| | | | | |
|---|---|---|---|---|
| DE | 4103665 | | * | 8/1992 |
| DE | 29913326 | U1 | | 11/1999 |
| DE | 10248342 | | | 10/2003 |
| EP | 1072832 | | | 6/2005 |
| WO | WO2006/007882 | | * | 1/2006 |
| WO | WO 2007/092778 | | | 8/2007 |

OTHER PUBLICATIONS

European Search Report from related EP 2031285 mailed Nov. 30, 2010.

* cited by examiner

*Primary Examiner* — John Fristoe, Jr.
*Assistant Examiner* — Jessica Cahill
(74) *Attorney, Agent, or Firm* — Pearl Cohen Zedek Latzer, LLP

(57) ABSTRACT

A valve is described having an inlet, an outlet, a sealing element and a device to generate a magnetic field, whereby the sealing element can be moved at least partially by the device and whereby the sealing element connects the inlet to the outlet in a fluid-conducting manner in that the sealing element lifts off at least partially from a valve seat wherein the sealing element is made at least partially of a foam element that can be deformed by the magnetic field.

17 Claims, 1 Drawing Sheet

VALVE WITH MAGNETIC SEALING ELEMENT MADE OF FOAM

This application claims the benefit of German Patent Application No. 102007041050.8 filed Aug. 29, 2007 and hereby incorporated by reference herein.

The invention relates to a valve comprising an inlet, an outlet, a sealing element and a device to generate a magnetic field, whereby the sealing element can be at least partially moved by the device and whereby the sealing element connects the inlet to the outlet in a fluid-conducting manner in that said sealing element lifts off at least partially from a valve seat.

BACKGROUND

Valves of the above-mentioned type are already known from the state of the art. In these valves, the sealing element is configured as a rigid part in order to interact with the magnetic field. Sealing elements are often designed as metal parts or as metal-plastic composite parts.

The valves of the generic type have the disadvantage that the hard sealing elements cause disturbing noises when they are lifted and strike the seat once again. Especially in the case of clocked valves, staccato-like noises can occur which are felt to be extremely unpleasant, particularly inside the cabins of aircraft.

SUMMARY OF THE INVENTION

An object of the present invention is therefore, creating a valve of the above-mentioned type that ensures low-noise operation and that has an inexpensive structure.

The present invention provides a valve comprising an inlet, an outlet, a sealing element and a device to generate a magnetic field, whereby the sealing element can be at least partially moved by the device and whereby the sealing element connects the inlet to the outlet in a fluid-conducting manner in that said sealing element lifts off at least partially from a valve seat wherein the sealing element is made at least partially of a foam element that can be deformed by the magnetic field.

It has been recognized according to the present invention that, due to the softness and resilience of a foam element, it can be laid onto a valve seat virtually without creating any noise. An elastic foam element that is reversibly deformable by a magnetic field can be moved out of its resting position by the magnetic field and it automatically returns to said resting position after the magnetic field is switched off. This makes it possible to dispense with relatively expensive metallic springs. Particularly in the case of a clocked valve, the softness of the foam element means that staccato-like noises can be prevented. When an embodiment of the valve described in the present invention is used in a vehicle, no annoying noises can be heard in the vehicle's interior that are caused by the sealing element as it strikes the valve seat. It has also been recognized according to the present invention that a foam element can be manufactured cost-effectively since foams can be created in any desired geometrical shape without any problem. Consequently, the above-mentioned objective is achieved.

The sealing element could release the valve seat while the shape of the foam element changes, thereby connecting the inlet and the outlet in a fluid-conducting manner. This ensures that the valve can be opened quickly, since the sealing element does not have to lift off in its entirety from the valve seat. Only certain areas of the sealing element can lift off partially from the valve seat, releasing slits or gaps through which a fluid can flow.

The foam element could have a first end and a second end, whereby the first end can be placed against the second end by the effect of the magnetic field while the foam element is compressed. Advantageously, recovery forces cause the foam element to decompress once the magnetic field has been switched off. The decompression causes the sealing element to lie once again on the valve seat, thus closing the fluid connection between the outlet and the inlet once again. Therefore, a magneto-elastic effect is utilized to open and close a valve.

The foam element could be associated with a deflection space. This deflection space allows the bulges created by the compression of the foam element to expand without resistance. The provision of a deflection space allows the foam element to be compressed by relatively small forces since the mechanical resistances are reduced. This permits the realization of a relatively large lifting height of the sealing element, as a result of which a large flow channel can be formed between the inlet and the outlet. Preferably, the lifting height can be about 20% of the height of the foam element.

Ferromagnetic particles can be distributed throughout the foam element. Owing to this embodiment, the foam element can be deformed by the magnetic field. Special preference is given to the use of iron particles since they are inexpensive.

The ferromagnetic particles can have a mean diameter within the range from 0.1 μm to 1 mm. Particles of this size entail the advantage that they do not interfere with the structure of the foam matrix. The webs between the pores of the foam element remain virtually unaffected in terms of their stability. Especially preferably, particles having a mean diameter of 0.5 μm to 10 μm could be employed since they can be easily dispersed in a foamable material and are distributed very homogeneously in the finished foam element. It has been found that smaller particles are more difficult to blend into the foamable material because of their very high specific surface area. Because of their settling behavior, larger particles give rise to non-homogeneous foam elements. The especially preferred range indicated optimizes the blending behavior and the homogeneity of the foam element.

The particles could occupy between 5 vol-% and 50 vol-% of the foam element. This range has proven to be particularly advantageous to create an adequately elastic foam element that also responds sufficiently to the magnetic field and can be deformed by the latter.

The sealing element could be configured as a cylindrical foam element whose end facing the valve seat has a seal. This embodiment allows the bearing for the sealing element to be manufactured rotation-symmetrically without any problem. The sealing element can be clamped into the bearing, as a result of which it is fixed in a resting position in which it rests on the valve seat. The creation of a seal allows a reliable fluid-tight separation of the inlet from the outlet. The seal could be configured as a film. Such a seal does not weigh much and, because it is thin, it can be easily deformed together with the foam element in order to partially lift off from the valve seat.

The foam element could have pores with a diameter ranging from 10 μm to 0.5 mm. This pore size has proven to be advantageous for purposes of achieving a very effective sealing effect. Open-cell or closed-cell foams can be employed for this purpose. In the case of open-cell foams, at least some of the individual pores are in contact with each other. In the case of closed-cell foams, all of the pores are isolated from each other in the polymer matrix. Closed-cell foams are particularly well-suited for use in a valve because the fluids to be sealed off cannot penetrate through the foam element. In this context, it is conceivable that the foam element and the seal are configured in a single piece, namely, as a component. The end of the foam element facing the valve seat could have a higher density and finer porosity than the rest of the foam element in order to seal very tightly.

The foam element could have a pore fraction of at least 5 vol-% so that it can be deformed by relatively weak magnetic fields without any problem.

The device to generate a magnetic field could comprise a coil. As a result, an electromagnet is created that allows rapid clocking of the valve.

The sealing element could be moveable at a magnetic flux density of 0.5 to 2 tesla. Advantageously, the sealing element can be moved, at least partially, by relatively weak currents.

It is conceivable that elastomeric foams consisting of thermoplastic elastomers are used as the foam element. As employed in this application, the term elastomeric foams refers to porous plastics that exhibit a rubber-elastic behavior. They can be chemically or physically loosely cross-linked polymers that behave steel-elastically below their glass-transition temperature and that are rubber-elastic above their glass-transition temperature. The glass-transition temperatures of the elastomers that are preferably employed lie at 20° C. [68° F.] or lower.

Preferably, the elastomeric foams used behave rubber-elastically until they reach their melting or decomposition temperature. Preferably employed thermoplastic elastomers are thermoplastic polyesters, thermoplastic polyamides, non-cross-linked thermoplastic polyolefins, partially cross-linked thermoplastic polyolefins, thermoplastic styrenic polymers and especially thermoplastic polyurethanes.

The foam element could consist of a foam made of ethyl vinyl acetate. A foam made of this material has proven to be particularly well-suited to hold homogeneously distributed ferromagnetic particles.

The valve described in the present invention could have several inlets. In this embodiment, the valve is suitable for use as a reversing valve in which two or more inlets can be alternately connected to the outlet in a fluid-conducting manner.

The valve described in the present invention is especially well-suited for use as a purge valve in vehicles since it operates virtually without any noise and can be clocked at a high frequency with small currents.

Starting at a given temperature, volatile hydrocarbons can be released into the atmosphere via the tank venting system of a vehicle. The Euro-2 standard has stipulated a specific limit value for this emission. In order to comply with this value, an activated-charcoal filter is installed in the tank venting system. This filter absorbs the hydrocarbons that have escaped and allows only pure air to reach the atmosphere. A purge valve is placed between the activated-charcoal filter and the intake pipe of the engine. The valve opens under certain conditions and allows the activated-charcoal filter to be regenerated. The fuel vapors are drawn into the intake pipe via the purge valve and then reach the internal-combustion chamber of the cylinders, where they are burned.

There are various possibilities to advantageously configure and refine the teaching of the present invention. Towards this end, reference is hereby made to the explanation below of a preferred embodiment of the invention making reference to the drawing.

Generally preferred embodiments and refinements of the teaching will also be explained in conjunction with the explanation below of the preferred embodiment of the invention making reference to the drawing.

BRIEF DESCRIPTION OF DRAWING

The single drawing shows the following.

DETAILED DESCRIPTION OF DRAWING

Figure 1:
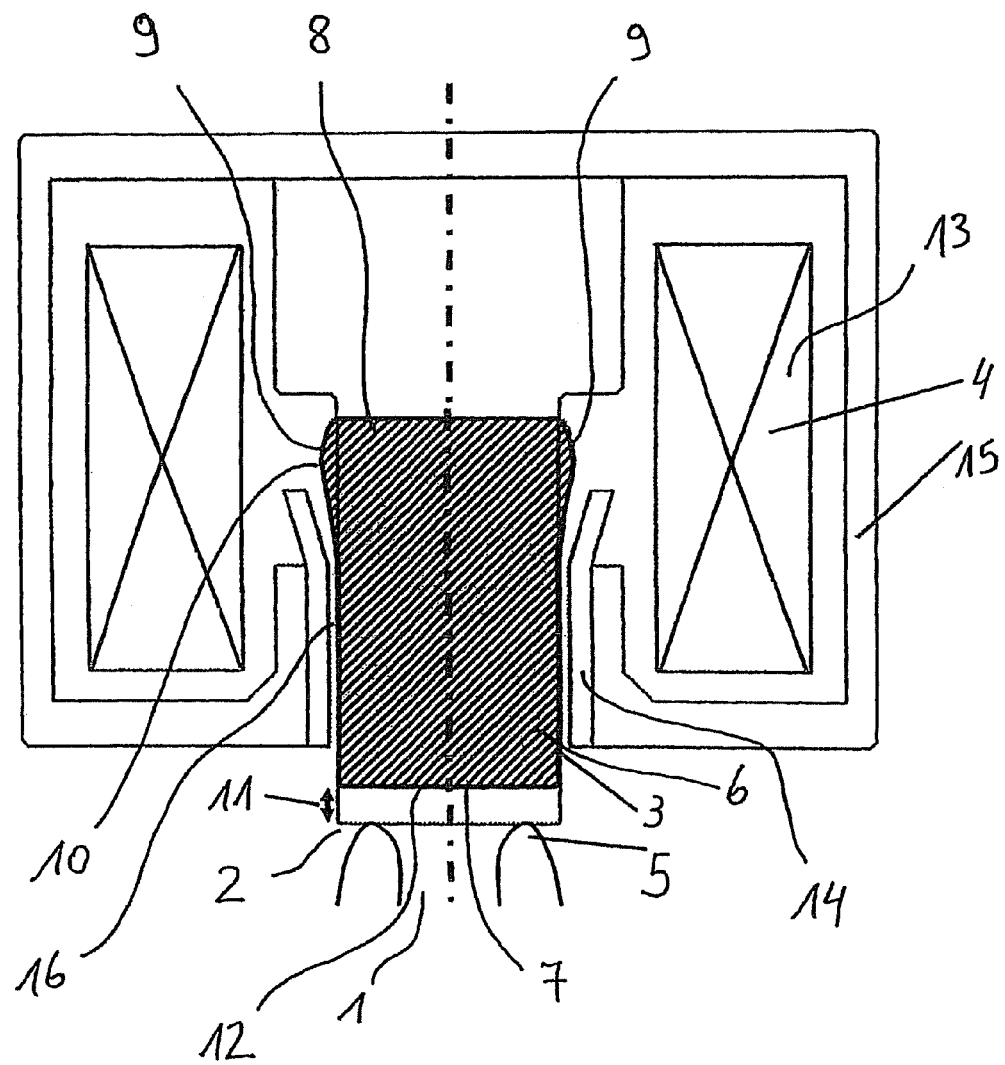
FIG. 1: shows a schematic sectional view of a valve having a sealing element with a foam element that can be lifted off from a valve seat by means of deformation.

The single FIGURE shows a valve having an inlet 1, an outlet 2, a sealing element 3 and a device 4 to generate a magnetic field, whereby the sealing element 3 can be moved at least partially by the device 4 and whereby the sealing element 3 connects the inlet 1 with the outlet 2 in a fluid-conducting manner in that the sealing element is lifted off at least partially from a valve seat 5. The sealing element 3 is made at least partially of a foam element 6.

The sealing element 3 releases the valve seat 5 while the shape of the foam element 6 changes, thereby connecting the inlet 1 with the outlet 2 in a fluid-conducting manner. The foam element 6 has a first end 7 and a second end 8, whereby the first end 7 can be placed against the second end 8 by the effect of the magnetic field while the foam element 6 is compressed. During the compression, bulges 9 are formed on the foam element 6 and they can penetrate into a deflection space 10. As a result, the sealing element 3 can easily execute an upstroke 11 so as to be lifted off from the valve seat 5.

The foam element 6 is configured cylindrically and mounted circumferentially in a bearing 16. Consequently, as a result of the compression, the sealing element 3 moves not in its entirety but rather only partially.

Ferromagnetic particles, namely, iron particles, are distributed throughout the foam element 6. The ferromagnetic particles have a mean diameter within the range from 0.1 μm to 1 mm. The particles occupy between 5 vol-% and 50 vol-% of the foam element 6. Owing to the ferromagnetic particles, the foam element 6 can interact with a magnetic field and be deformed in this process.

The sealing element 3 is configured as a cylindrical foam element 6 whose end 7 facing the valve seat 5 has a seal 12.

The foam element 6 has pores whose diameters range from 10 μm to 0.5 mm. The foam element 6 has a pore fraction of at least 5 vol-%.

The device 4 to generate a magnetic field comprises a coil 13 that concentrically surrounds a soft-magnetic sleeve 14. The coil 13 is surrounded by a housing 15 that guides the magnetic field lines. The sealing element 3 is moveable at a magnetic flux density of 0.5 to 2 tesla.

In conclusion, particular mention should be made of the fact that the embodiment selected purely randomly above serves merely to elucidate the teaching according to the invention but that it does not limit the latter to this embodiment.

What is claimed is:

1. A valve comprising:
   an inlet that passes through a circular valve seat;
   an outlet that passes around the circular valve seat;
   a cylindrically shaped sealing element; and
   a device to generate a magnetic field,
   the sealing element being at least partially movable by the device in an axial direction towards and away from the valve seat, and the sealing element connecting the inlet to the outlet in a fluid-conducting manner such that the sealing element lifts off at least partially from the valve seat;

the sealing element being made at least partially of a foam element that can be deformed by the magnetic field;

whereby axial compression of the foam element results in radial expansion of the foam element and movement of the sealing element in an axial direction away from the valve seat so as to open the valve.

2. The valve as recited in claim 1, wherein the sealing element releases the valve seat while the shape of the foam element changes, thereby connecting the inlet and the outlet in a fluid-conducting manner.

3. The valve as recited in claim 1, wherein the foam element has a first end and a second end; the first end moves towards the second end by the effect of the magnetic field while the foam element is compressed.

4. The valve as recited in claim 1, wherein the foam element is associated with a deflection space, wherein the deflection space provides a defined region into which a bulge in the foam element created by said radial expansion penetrates.

5. The valve as recited in claim 1, wherein ferromagnetic particles are distributed throughout the foam element.

6. The valve as recited in claim 5, wherein the ferromagnetic particles have a mean diameter within a range from 0.1 µm to 1 mm.

7. The valve as recited in claim 5, wherein the ferromagnetic particles occupy between 5 vol-% and 50 vol-% of the foam element.

8. The valve as recited in claim 1, wherein the sealing element is configured as a cylindrical foam element whose end facing the valve seat has a seal.

9. The valve as recited in claim 1, wherein the foam element has pores with a diameter ranging from 10 µm to 0.5 mm.

10. The valve as recited in claim 1, wherein the foam element has a pore fraction of at least 5 vol-%.

11. The valve as recited in claim 1, wherein the device to generate a magnetic field comprises a coil.

12. The valve as recited in claim 1, wherein the sealing element is movable at a magnetic flux density of 0.5 to 2 tesla to execute an upstroke.

13. The valve as recited in claim 1, wherein the sealing element is configured as a foam element that can be deformed reversibly by the magnetic field.

14. The valve as recited in claim 1, wherein the sealing element is configured as a the foam element that can be inserted as an individual part into a bearing form in the valve and can be removed from the latter without destruction.

15. The valve as recited in claim 1, wherein the sealing element opens the sealing seat with a shape change of the foam element and, as a result, connects the inlet to the outlet in a fluid-conducting manner.

16. The valve as recited in claim 1, wherein the sealing element is configured as a cylindrical foam element, an end of which, which faces the sealing seat, has a seal.

17. The valve as recited in claim 1, wherein the sealing element comprises a flat face, wherein the flat face abuts against the circular valve seat creating a seal.

\* \* \* \* \*